US009464730B2

(12) United States Patent
Bihlet

(10) Patent No.: US 9,464,730 B2
(45) Date of Patent: Oct. 11, 2016

(54) EXHAUST VALVE SPINDLE FOR AN EXHAUST VALVE IN AN INTERNAL COMBUSTION ENGINE

(71) Applicant: MAN DIESEL & TURBO, FILIAL OF MAN DIESEL & TURBO SE, TYSKLAND, Copenhagen SV (DK)

(72) Inventor: Uffe Bihlet, Copenhagen SV (DK)

(73) Assignee: MAN DIESEL & TURBO. FILIAL AF MAN DIESEL & TURBO SE. TYSKLAND, Copenhagen (DE)

( * ) Notice: Subject to any disclaimer, the term of this patent is extended or adjusted under 35 U.S.C. 154(b) by 343 days.

(21) Appl. No.: 13/915,034

(22) Filed: Jun. 11, 2013

(65) Prior Publication Data

US 2014/0008562 A1    Jan. 9, 2014

(30) Foreign Application Priority Data

Jul. 6, 2012 (DK) .................................. 2012 70414

(51) Int. Cl.
*F16K 41/00* (2006.01)
*F01L 3/04* (2006.01)
*C22C 19/05* (2006.01)
(Continued)

(52) U.S. Cl.
CPC ................ *F16K 41/00* (2013.01); *B22F 3/15* (2013.01); *B22F 5/008* (2013.01); *C22C 1/0433* (2013.01); *C22C 19/05* (2013.01); *C22C 19/058* (2013.01);
(Continued)

(58) Field of Classification Search
CPC ............ F01L 3/02; F01L 3/04; F16K 41/00; C22C 1/0433; C22C 1/0441; C22C 19/05; C22C 19/052; C22C 19/058; C22C 38/26; C22F 1/08; B22F 3/15; B22F 5/0008
See application file for complete search history.

(56) References Cited

U.S. PATENT DOCUMENTS 4,400,209 A * 8/1983 Kudo .................... C22C 19/052
420/443
4,686,348 A * 8/1987 Johns ........................ F01L 3/02
123/41.77
(Continued)

FOREIGN PATENT DOCUMENTS

EP          0521821 A2    7/1996
EP        1 820 868 A1    8/2007
(Continued)

OTHER PUBLICATIONS

Fedorava et al., Influence of Band Zr on Microstructure and Mechanical Properties of Alloy 718, 7th International Symposium on Superalloy 718 and Derivatives, Oct. 2010, pp. 837-846.
(Continued)

*Primary Examiner* — Craig Schneider
*Assistant Examiner* — Ian Paquette
(74) *Attorney, Agent, or Firm* — Sughrue Mion, PLLC

(57) ABSTRACT

An exhaust valve spindle for an exhaust valve in an internal combustion engine has a shaft and a valve disc at the lower end of the shaft, which valve disc at its upper surface has a seat area. The seat area is of a seat material comprising at least from 34.0 to 44.0% Cr, an aggregate amount of Nb and Ta in the range from at least 2.8 to 6.1%, from 0.3 to 2.0% Ti, at the most 0.2% Al, at the most 0.04% B, at the most 0.8% Fe, at the most 0.04% C, at the most 0.4% Si, and a balance of Ni, where the amount of Ti+Nb+0.5×Ta is in the range from 3.4 to 6.6%, and where the amount of Nb+0.5× Ta is less than 3.0% if the amount of Ti is larger than 1.5%.

20 Claims, 4 Drawing Sheets

Figure 1:
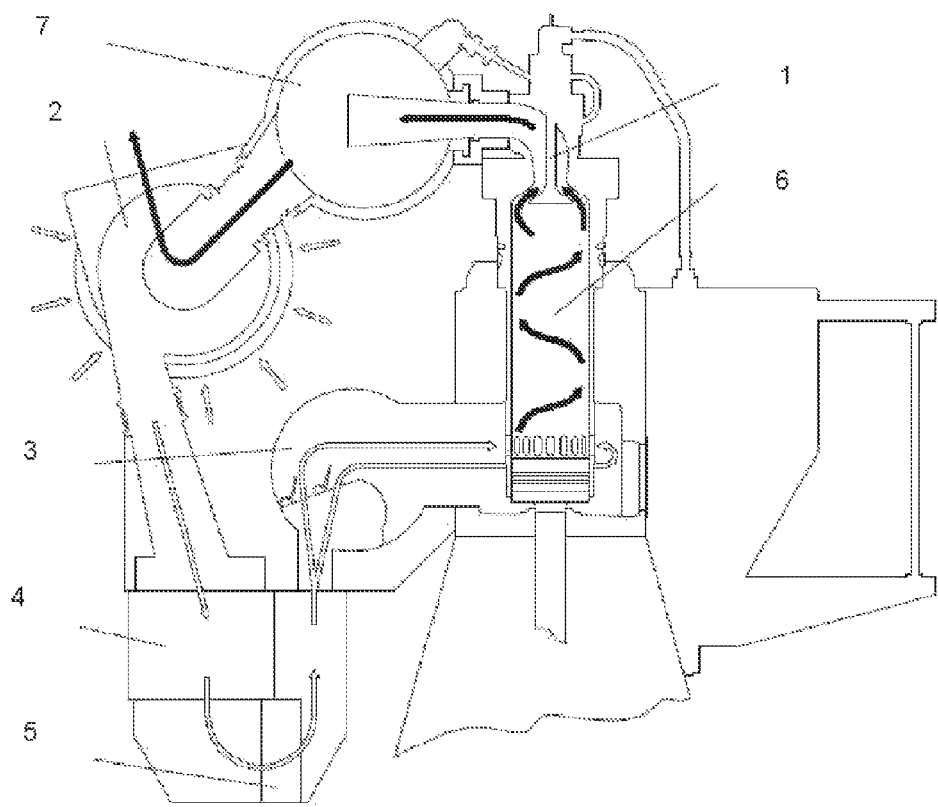

(51) Int. Cl.
  *C22F 1/08* (2006.01)
  *B22F 3/15* (2006.01)
  *B22F 5/00* (2006.01)
  *C22C 1/04* (2006.01)

(52) U.S. Cl.
  CPC .. *C22F 1/08* (2013.01); *F01L 3/04* (2013.01); *Y10T 29/493* (2015.01)

(56) References Cited

U.S. PATENT DOCUMENTS

| | | | |
|---|---|---|---|
| 4,997,623 A * | 3/1991 | Brill | C22C 19/058 420/442 |
| 5,958,332 A | 9/1999 | Hoeg | |
| 6,173,702 B1 | 1/2001 | Hoeg | |
| 6,298,817 B1 | 10/2001 | Hoeg | |
| 6,443,115 B1 | 9/2002 | Hoeg | |
| 2008/0121319 A1 | 5/2008 | Rokutanda et al. | |
| 2010/0272597 A1 | 10/2010 | Qiao et al. | |
| 2012/0097297 A1 | 4/2012 | Rokutanda et al. | |
| 2015/0027598 A1 * | 1/2015 | Seng | A61L 31/022 148/578 |

FOREIGN PATENT DOCUMENTS

| | | |
|---|---|---|
| JP | H06277876 A | 4/1994 |
| JP | H8-188841 A | 7/1996 |
| WO | 2011050815 A1 | 5/2011 |

OTHER PUBLICATIONS

Hanna et al., Diesel Engine Combustion Chamber Materials for Heavy Fuel, The Institute of Marine Engineers Proceedings, 1990, Paper 14, pp. 131-143.

* cited by examiner

EXHAUST VALVE SPINDLE FOR AN EXHAUST VALVE IN AN INTERNAL COMBUSTION ENGINE

The present invention relates to an exhaust valve spindle for an exhaust valve in an internal combustion engine, which exhaust valve spindle has a shaft and a valve disc at the lower end of the shaft, which valve disc at its upper surface has a seat area, wherein the valve disc is of a base material and the seat area is of a seat material different from the base material.

EP-A-0 521 821 describes a valve made of Nimonic 80A or Nimonic 81, which is provided with a layer of Inconel 625 or of Inconel 671 in the seat area to impart to the seat a higher corrosion resistance than the Ni-monic base body. The publication mentions for the alloy Inconel 671 that it only has to be welded on, while for the alloy Inconel 625 it mentions that after the welding it contains a dendritic carbide structure and that the seat area therefore has to be hot-worked to homogenise the carbide distribution in the structure in order to improve corrosion resistance. Inconel alloy 625 is mentioned to have a composition of up to 0.10% C, up to 0.5% Si, up to 5% Fe, up to 0.5% Mn, 21% Cr, up to 0.4% Ti, up to 0.4% Al, up to 1.0% Co, 9% Mo, 3.6% Nb+Ta, and the balance Ni. Inconel alloy 671 is mentioned to have a composition of 0.04 to 0.05% C, 47 to 49% Cr, 0.3 to 0.40% Ti, and the balance Ni. EP-A-0 521 821 describes the finding that Inconel 671 having about 48% Cr does not provide a corrosion resistance as good as that of Inconel 625 having 21% Cr. Nimonic and Inconel are proprietary trademarks of Special Metals Inc.

The book 'Diesel engine combustion chamber materials for heavy fuel operation' published in 1990 by The Institute of Marine Engineers, London, collected the experience gained from the whole industry and in the resulting chapter on pages 131-143 conclusions were made. In a valve having a seat material different from the base material, the book calls the seat material a hardfacing. The hardfacings standing out during all the tests were Deloro alloy 60: 16% Cr, 4.5% Si, 4.5% Fe, 3.5% B, 0.5% C, and the balance Ni; Colmonoy 8: 26% Cr, 4% Si, 3.3% B, 1.0% Fe, 0.95% C, and the balance Ni; and Tristelle TS2: 35% Cr, 12% Co, 10% Ni, 5% Si, 2.0% C, and the balance Fe. It was concluded on page 143 that chromising offers no significant improvement in corrosion protection to nickel based alloys for exhaust valves. It is quite clearly difficult to choose an alloy having the required properties for a seat material in an exhaust valve, in particular when the fuel burned in the engine contains vanadium and sulphur.

WO 96/18747 describes an exhaust valve spindle with a welded-on hardfacing alloy analyzed at 40-51% Cr, from 0 to 0.1% C, less than 1.0% Si, from 0 to 5.0% Mn, less than 1.0% Mo, from 0.05 to 0.5% B, from 0 to 1.0% Al, from 0 to 1.5% Ti, from 0 to 0.2% Zr, from 0.5 to 3.0% Nb, an aggregate content of Co and Fe of 5.0% at the most, at the most 0.2% 0, at the most 0.3% N, and the balance Ni. Following the welding a high hardness of 550 HV20 may be imparted to the seat material by means of a heat treatment at a temperature exceeding 550° C. It is generally presumed that hot-corrosion-resistant alloys containing chromium and nickel, age-harden at temperatures ranging from 550° C. to 850° C., with the result that the alloy becomes harder and more brittle. Attempts to make welded-on hardfacings having a high content of Cr are typically damaged by hot cracks developed during solidification and cooling at the welding process, however WO 96/18747 describes that the content of B of at least 0.05% (preferably at least 0.2% boron) in the alloy causes the hot cracks to be reduced or disappear. Furthermore, the content of Ti should be kept below 0.1% and the content of Al should be kept below 0.1% in order to suppress precipitation hardening at welding. WO 96/18747 discloses three specific alloys, all having above 48% Cr and 0.1% B, and in these alloys the precipitation hardening mechanism acts so slowly that the alloy substantially does not harden at welding onto the valve, but hardens during a subsequent heat treatment.

In the case of cast members, to achieve excellent hot corrosion resistance, particularly in environments containing sulphur and vanadium from heavy fuel oil combustion products, it is known to use an alloy of the type 50% Cr and 50% Ni, or an alloy of the type IN 657 having a design composition of 48-52% Cr, 1.4-1.7% Nb, at the most 0.1% C, at the most 0.16% Ti, at the most 0.2% C+N, at the most 0.5% Si, at the most 1.0% Fe, at the most 0.3% Mg, and the balance Ni. After casting, the alloy comprises a nickel-rich γ-phase and a chromium-rich α-phase where both phases, depending on the accurate analysis of the alloy, may constitute the primary dendrite structure. It is known that these alloys age-harden at operating temperatures exceeding 600° C. As the alloy after casting cools off, the alloy does not solidify in its equilibrium state. When subsequently the alloy is at operating temperature, precipitation of the under-represented phase proportion occurs by transformation of the over-represented phase proportion, which causes embrittlement characterized in a ductility of less than 4% at room temperature.

The exhaust valve spindle can be provided with a corrosion resistant alloy on the lower surface facing the combustion chamber. This lower surface is far from being subjected to mechanical action, like the influences acting on the valve seat, but the corrosion resistance needs to be high. WO 97/47862 generally describes an alloy comprising from 38 to 75% Cr, from 0 to 3.0% Nb, and a balance of Ni, where the corrosion-resistant alloy has a hardness of less than 310 HV measured at approximately 20° C. after the material has been heated to a temperature within the range of 550-850° C. for more than 400 hours. A specific example described is an alloy comprising 46% Cr, 0.4% Ti, 0.05% C, and the balance Ni.

From the market it is known to provide a welded-on hardfacing of Inconel 718 onto a valve base material of stainless steel where the hard-facing is rolled and heat treated in order to provide the seat material with the desired mechanical properties. In Inconel 718 the content of Fe is necessary for the slow precipitation of strength increasing particles. This slow precipitation is considered unique to Inconel 718 and has provided this alloy with special advantages among superalloys within in particular the turbine industry. Inconel 718 has the composition 19% Cr, 5.2% Nb, 0.9% Ti, 52.5% Ni, 3% Mo, 0.5% Al, and the balance Fe. A valve of this type has the advantage that Inconel 718 has excellent mechanical properties as required for a valve seat area, including strength and ductility. Unfortunately, a valve of this type does not have a corrosion resistance at high temperatures comparable to or better than the corrosion resistance of Nimonic 80A. Nimonic 80A is not weldable, and consequently it is required to make the entire valve disc out of Nimonic 80A as it cannot be provided as a hardfacing on a base material like stainless steel. Nimonic 80A has the composition 19% Cr, 2.4% Ti, 0.2% Fe, 1.7% Al, and the balance Ni. It is of course an advantage to use an iron-based base material instead of a nickel-based base material.

The present invention aims at improving an exhaust valve spindle having a seat area of a seat material different from the base material of the disc so that the seat area obtains excellent mechanical properties combined with a high-temperature corrosion resistance comparable to or better than the alloy Nimonic 80A.

In view of this, the initially mentioned exhaust valve spindle of the present invention is characterized in that the seat material is of a nickel-based alloy, which alloy stated in percent-by-weight and apart from common impurities and inevitable residual amounts of deoxidizing components comprises at least from 34.0 to 44.0% Cr, an aggregate amount of Nb and Ta in the range from at least 2.8 to 6.1%, from 0.3 to 2.0% Ti, at the most 0.2% Al, at the most 0.04% B, at the most 0.8% Fe, at the most 0.04% C, at the most 0.4% Si, and a balance of Ni, where the amount of Ti+Nb+0.5×Ta is in the range from 3.4 to 6.6%, and where the amount of Nb+0.5×Ta is less than 3.0% if the amount of Ti is larger than 1.5%.

A nickel-based superalloy of such a composition has unexpectedly turned out to be able to utilize strength increasing heat treatment involving slow precipitation of $\gamma''$ ($Ni_3Nb$) particles in body-centered-tetragonal configuration despite the fact that the alloy has only a low content of or lacks Fe, and despite the fact that the content of Cr is very high and would normally involve formation of large and coherent dendritic structures of a commonly observed $\alpha$-Cr phase of body-centered-cubic type, a phase often seen to form readily and quickly when the Cr content is significantly higher than 22% in the nickel-based superalloy.

Nb and Ta are considered to have similar effects on the desired precipitation, however the atomic weight of Ta is almost twice the atomic weight of Nb, and due to this the amount of Nb plus half the amount of Ta (Nb+0.5×Ta) in percentage by weight is a relevant figure to the present invention. Due to market conditions, and the similar effect of Nb and Ta, it is possible to leave out Ta from the alloy and use Nb instead.

New studies have shown that B influences superalloys of the type Inconel 718 in a direction of increased tendency to hot cracking, and the content of B in the alloy should be kept at 0.04% or less, and preferably at less than 0.01% B ("INFLUENCE OF B AND ZR ON MICROSTRUCTURE AND MECHANICAL PROPERTIES OF ALLOY 718" by T. Fedorova et al., 7th International Symposium on Superalloy 718 and Derivatives, TMS (The Minerals, Metals & Materials Society), 2010.

The amount of Fe is limited to at the most 0.8% in order to obtain high hot corrosion resistance. Al may form a hardness-increasing intermetallic compound with nickel of the type $\gamma'$, which is quickly forming and thus undesired. The amount of Al is thus limited to at the most 0.2%, and preferably the amount of Al is limited to at the most 0.05%.

The amount of Si is limited to at the most 0.4% in order to suppress precipitation of undesired amounts of hardness-increasing silicides and further to restrict a solution-strengthening effect on the nickel-rich $\gamma$-phase in the basic structure of the material.

To achieve high safety against precipitation of carbide compounds the C content should be as low as possible, but since C is a common impurity in many metals it may be suitable for economic reasons to limit the C content to 0.04% at the most.

The desired precipitation of $\gamma''$ ($Ni_3Nb$) particles in body-centered-tetragonal configuration seems to depend on the contents of Nb and Ti and Cr in the alloy, but it is presently not entirely clear how the behaviour is. Experiments suggest that an aggregate amount of Nb and Ta of 2.8% can be sufficient for the desired effect, at least when combined with higher amounts of Ti. And an aggregate amount of Nb and Ta higher than 6.1% seems to cause too quick precipitation. Amounts of Ti higher than 2.0% accelerate the precipitation and is assumed to involve other types of precipitation than the desired $\gamma''$. Experiments further suggest that if the amount of Ti is larger than 1.5% then it is required that the amount of Nb+0.5×Ta is less than 3.0% or otherwise precipitation seems to occur too quickly. It further seems that interact in such a manner that the amount of Ti+Nb +0.5×Ta should be in the range from 3.4 to 6.6% for the desired rather slow precipitation.

Compared with a seat material of the alloy Inconel 718, the content of Cr has been nearly doubled and this involves a significant increase in the corrosion resistance at high temperature. When the engine is running the exhaust valve is heated to an elevated temperature, and the severeness of corrosion attacks from the chemical substances in the exhaust gas is heavily increasing with temperature. The mechanical properties of the seat material are naturally important because combustion residue particles will get caught between the closing valve seat surfaces on the movable exhaust valve spindle and the stationary valve seat on the valve housing mounted in the cylinder section of the engine. The mechanical properties are also important because the valve seat surfaces close onto each other with high forces, as the maximum combustion pressure acts on the full lower side area of the exhaust valve spindle and is transferred to the stationary valve housing part via the valve seat area, which has a much smaller area than the area of the lower side of the valve.

It is thus quite natural that much focus has been on the mechanical properties of the seat material. However, it is for the durability of the exhaust valve also important to consider the high-temperature corrosion resistance. When a combustion residue particle actually gets caught between the closing valve seat surfaces it will deform the surfaces. If a part of this deformation is plastic then a risk is present for blow-by of combustion gasses. This involves hot combustion gas that flows through a channel across the valve seat surfaces, and because the combustion gasses are hot the blow-by will cause significant heating of the seat material surrounding the channel, and the increased temperature will cause increased corrosion attacks. It is highly desirable that the seat material is able to withstand such a corrosion attack. The significant increase in the content of Cr in the seat material, and the reduction in the content of Fe—as compared with Inconel 718—involve a considerable increase in the high-temperature corrosion resistance. At the same time the seat material has achieved very high mechanical strength, and quite importantly has achieved the strength by a strengthening mechanism that is initially somewhat delayed but otherwise rather quickly obtained in the seat material during heat treatment.

In an embodiment the aggregate amount of Nb and Ta in the alloy of the seat material is in the range from 3.2 to 6.1%. The lower limit of 3.2% ensures that the desired mechanical properties can be obtained, and the upper limit of 6.1% is considered an advantage in view of having several opportunities for mechanical procedures when applying the seat material to the base material.

In another embodiment the aggregate amount of Nb, Ta and Ti in the alloy of the seat material is in the range from 4.1 to 6.6%. Experiments indicate that if the lower value of 4.1% is not obtained then the seat material may not have the best mechanical properties, and if the higher value of 6.6% is surpassed then the strength increase is likely to occur too rapidly.

In an embodiment considered suitable for a HIP process, the alloy of the seat material comprises at least from 39 to 41% Cr, from 3.2 to 3.8% Nb, from 0.3 to 0.7% Ti, at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% O, at the most 0.05% N, and a balance of Ni.

It is preferred that the alloy comprises at the most 0.05% Al. In general the alloy of the seat material preferably comprises at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% O, at the most 0.05% N, and a balance of Ni.

With respect to minimizing the use of less available materials, it is preferred that the base material of the valve disc is of a stainless steel. Stainless steel is readily available and is also easy to dispose off, if required.

In an embodiment of the exhaust valve the seat material in aged condition has the following main mechanical properties: a yield strength of at least 980 MPa, an ultimate tensile strength of at least 1200 MPa, and an elongation at breakage of at least 19%. These mechanical properties are on level with or better than the properties of prior art exhaust valve. These mechanical properties are obtained at the same time as the high-temperature corrosion resistance.

The exhaust valve according to the present invention is advantageously a valve in a uniflow scavenging two-stroke internal combustion engine of the crosshead type. Engines of this type are typically burning fuel of very low grades (heavy fuel oil) and this kind of fuel often involves large amounts of vanadium and sulphur in the fuel, and thus a heavy corrosion loading on the exhaust valve.

In another aspect the present invention involves a method of manufacturing an exhaust valve spindle for an exhaust valve in an internal combustion engine, which exhaust valve spindle has a shaft and a valve disc at the lower end of the shaft, which valve disc at its upper surface has a seat area, comprising the steps of:

a) providing a valve disc of a base material, which valve disc is shaped with an annular recess in its upper surface, which recess extends a distance down below the upper surface of the valve disc, characterized by b) providing in the recess a valve seat material of a nickel-based alloy as claimed in claim 1, which seat material is different from the base material, c) performing cold deformation in the seat material, preferably by rolling the outside surface of the seat material, d) subjecting the valve disc to a heat treatment causing hardening at least by precipitation of γ" ($Ni_3Nb$) particles in body-centered-tetragonal configuration.

It has very unexpectedly turned out that a nickel-based alloy as claimed in claim 1, with its high content of Cr and very low content of Fe and Al, if any, is capable of precipitation of γ" ($Ni_3Nb$) particles in body-centered-tetragonal configuration. This type of precipitation is very different from γ' precipitation, face-centered-cubic precipitation and other types of precipitation in the nickel-based alloy structure. The precipitations of γ" ($Ni_3Nb$) particles in body-centered-tetragonal configuration take some time because Nb has a low rate of diffusion in the face-centered-cubic lattice structure in the crystal grains of the alloy. In some instances, the time required for precipitation can be utilized to perform step b) in such a short time that significant precipitation has not yet occurred in the seat material, and the seat material may then be cold deformed by rolling without any intermediate solution heat treatment.

In one embodiment step b) relating to the valve seat material involves a HIP process (Hot Isostatic Pressuring). The HIP process provides a valve seat material completely free from porosities.

In an alternative embodiment step b) relating to the valve seat material involves a laser welding process, where particulated alloy material is supplied to the recess and welded into a coherent mass of material.

If the valve seat material provided in step b) has too high a level of precipitation then it may be advantageous to perform in between the steps b) and c) an intermediate step of a solution heat treatment.

The heat treatment in step d) may take a long time, such as several days, but preferably the heat treatment of step d) has a duration of at the most 24 hours, which allows batch processing once a day, and even more preferably, the heat treatment of step d) has a duration of at the most 9 hours so that one valve head or a set of valve heads can be processed more efficiently.

Figure 6:
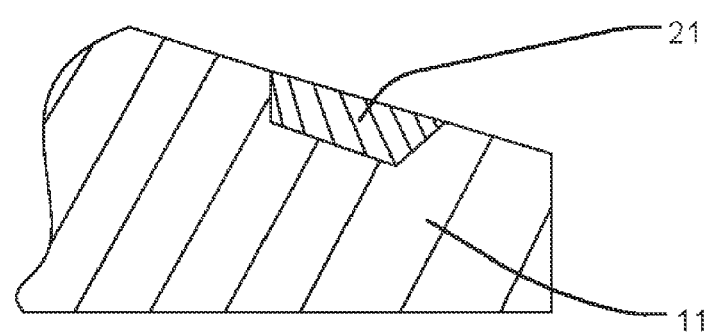
Figure 2:
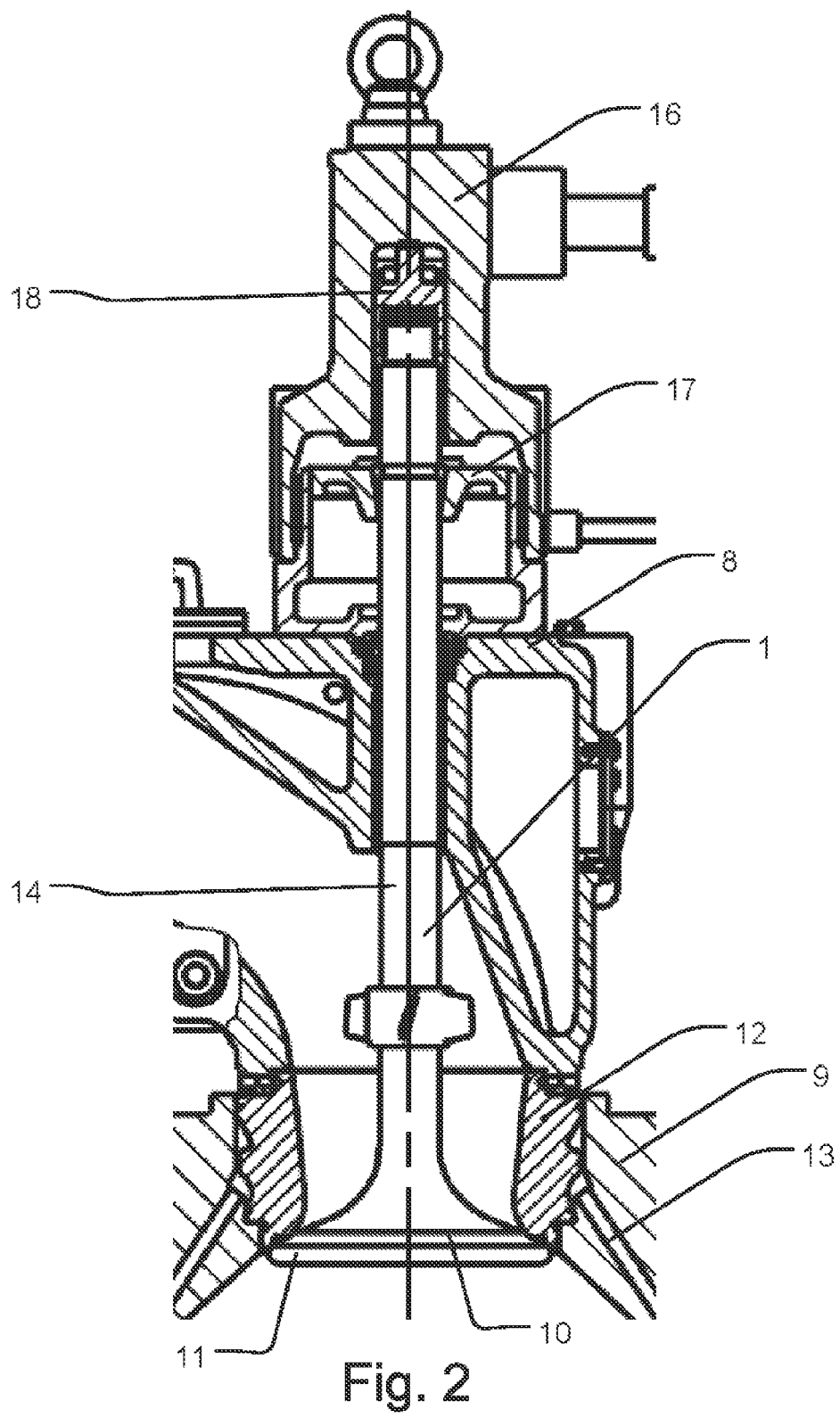
Figure 7:
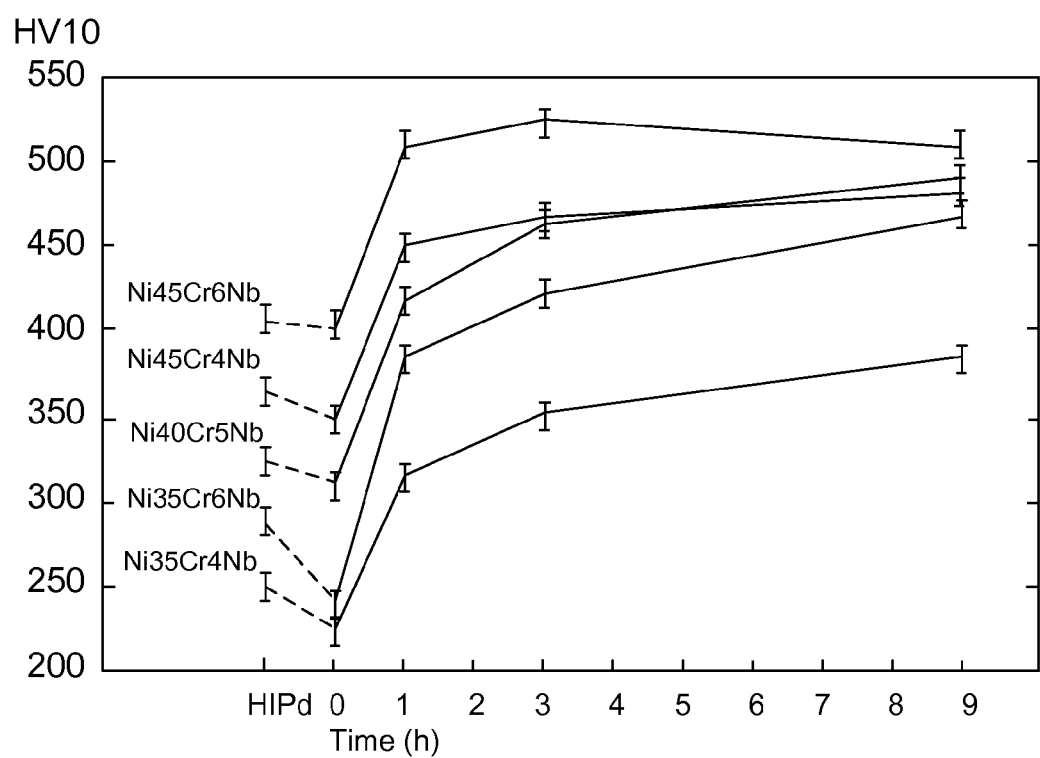

In the following the invention is exemplified and described in further detail with reference to the highly schematic drawings, on which FIG. 1 illustrates a cylinder in a uniflow scavenged internal combustion engine, where an exhaust valve spindle according to the present invention is mounted at the top of the cylinder, FIG. 2 illustrates the exhaust valve spindle in FIG. 1 in closed state, FIGS. 3-6 illustrate how valve seat material is provided onto a valve disc, and FIG. 7 depicts hardness of alloys according to Example 3 when exposed to 700° C. after a 1 h solution treatment at 1100° C. followed by water quenching.

An exhaust valve spindle 1 is viewed in FIG. 1 in an open position allowing intake air to be supplied from a turbocharger 2 to a scavenge air receiver 3 via a scavenge air cooler 4 and a water mist catcher 5. The intake and scavenge air flows from the scavenge air receiver through a row of scavenge air ports in the lower end of a cylinder 6 and upwards through the cylinder in a swirling motion indicated by black arrows and up towards the upper portion of the cylinder, while at the same time pressing out hot combustion gasses via the open exhaust valve and into the exhaust gas receiver 7. The flow of hot combustion gasses past the valve seats of the exhaust valve can occur at high gas speeds, in particular when the valve opens and closes.

The exhaust valve spindle 1 is mounted in an exhaust valve housing 8 that is fixed to a cylinder cover 9 at the top of the cylinder, see FIG. 2. In the closed position of the exhaust valve, a seat area 10 on the upper side of a valve disc 11 abuts a corresponding valve seat on a stationary part 12, also called the bottom piece, of the valve housing. Seat area 10 is annular and located next to a rounded outer end portion of the valve disc. The stationary part 12 is cooled by water circulating through cooling bores 13. The exhaust valve spindle has a shaft 14, which shaft extends upwards from the valve disc and across the exhaust channel and continues upwards through a guiding bore in the exhaust valve housing 8 and up into an exhaust valve actuator 16. A piston 17 of a pneumatic spring is mounted to the outside of the shaft. A hydraulic actuator piston 18 on top of the spindle can activate the spindle for downward movement, and the pneumatic spring acts in the opposite direction and close the exhaust valve when the pressure in the hydraulic actuator is relieved. The illustrated embodiment is an exhaust valve in an engine of one of the types ME, MC or ME-GI of applicant's brand. The exhaust valve spindle could also be mechanically actuated in well-known manner, and a mechanical return spring could also be used. The portion of the stem located in the exhaust channel is provided with oblique fins extending out radially from the stem. These fins cause the exhaust valve spindle to rotate some degrees in the circumferential direction when the exhaust gas is flowing out. In another embodiment the stem does not have such fins. The lower surface of the valve disc is in an embodiment provided with a layer of hot corrosion resistant material (not shown).

The exhaust valve spindle can be for a four-stroke internal combustion engine, or it can be for a two-stroke engine, preferably a large two-stroke internal combustion engine, which may have cylinder diameters ranging from 250 to 1100 mm. The outer diameter of the exhaust valve disc 11 is in the range from 100 mm to 600 mm, depending on the cylinder bore, when the valve is for such two-stroke engines. The internal combustion engine utilizing the exhaust valve spindles may be of the make MAN Diesel & Turbo, such as of the type MC, ME or GI, or may be of the make Wärtsilä, such as of the type RTA of RTA-flex, or may be of the make Mitsubishi.

Figure 3:
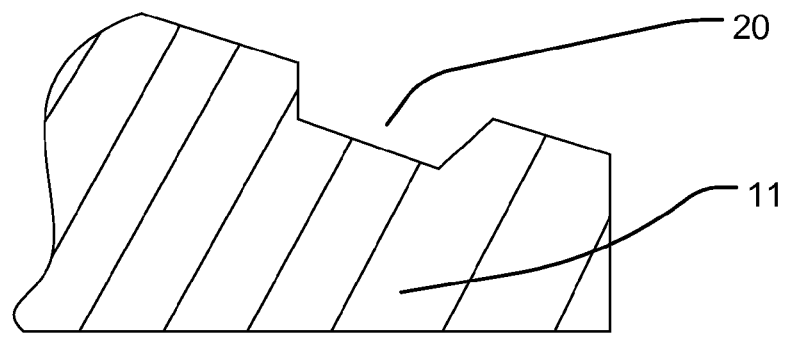

The following exemplifies how an exhaust valve is made. There is firstly provided a valve disc of a base material. The valve disc is typically forged out and has an annular recess 20 in its upper surface, which recess extends a distance down below the upper surface of the valve disc (FIG. 3). This distance is typically in the range from 15 to 50% of the vertical thickness of the valve disc at the radial location of the annular valve seat. For the larger exhaust valves the distance is typically in the range from 6 mm to 40 mm, such as from 6 to 30 mm. The base material is typically a stainless steel, such as an alloy having 0.25% C, 1.4% Si, 1.3% Mn, 20% Cr, 9% Ni, 3% W, and the balance Fe. Other stainless steels can also be used and are well-known in the art of exhaust valves. It is also possible to use a superalloy, like Nimonic 80A, as the base material. The valve disc can be made in a single piece with the stem, but it is also possible to make the valve disc with only the lowermost portion of the stem, and then mount the main portion of the stem after the valve disc has been heat treated. Such mounting can e.g. be performed by friction welding or welding.

Figure 4:
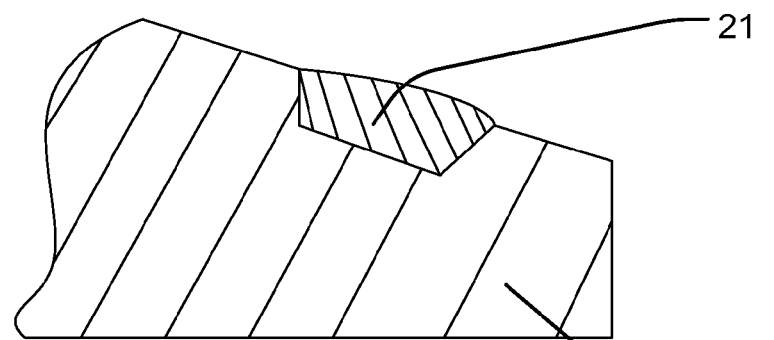

The valve seat material 21 is then provided in the recess as illustrated in FIG. 4. This can be done in several manners. Preferably, the valve seat material is provided by a powder metallurgical process, such as HIP or laser welding or cold spaying. When done by the so-called Cold Spray process a hot gas jet is produced by introducing a preheated and compressed inert gas into a nozzle. Powder particles in the size range of 1-50 micron are introduced into the stream and thereby accelerated to supersonic speed, allowing the powder particles to bond and deposit on suitable substrates, like the base material forming the recess in the valve disc or already deposited powder particles. In contrast to other thermal spraying processes the powder particles do not melt at any point in the Cold Spray process. Typical process parameters for the Cold Spray process are: Gas pressure in the range of 30-50 bar; gas preheat temperature in the range of 500-1000° C.; powder flow in the range of 50-150 g/min; powder velocity in the range of 600-2000 m/sec. Also a variant of the Cold Spray process in the form of a laser assisted Cold Spray process can be applied. By continuously preheating the substrate ahead of the position of deposition of the powder, the process can be optimized to enable a high deposit quality also at the lower range of process parameters. Cold spraying is followed by a solution heat treatment, e.g. at 1100° C. for 1 hour, in order to achieve full metallurgical binding through diffusion of components in the structure of the valve seat material.

The particulate material may be obtained in several different manners which are well-known in the art. The particulate materials may, for example, have been manufactured by atomisation of a liquid jet of a melted alloy of the desired composition into a chamber with an inactive atmosphere, whereby the material is quenched and solidifies as particles with a very fine dendritic structure. The particulate material may also be called a powder.

When the seat material is formed by means of a HIP process, the valve disc of the base material, such as steel, alloyed steel or a nickel alloy, is manufactured in the usual manner to the desired shape including the recess for the seat material. Then the desired seat material in the form of particulate or powder is filled into the recess and applied on the base body by a well-known HIP process (HIP is an abbreviation of Hot Isostatic Pressure). The valve disc with the powder filled into the recess is then arranged in a mould and placed in a HIP chamber which is closed, and a vacuum is applied to extract undesired gases. Alternatively, the valve disc with the powder filled into the recess is arranged in a capsule which is subsequently evacuated to extract undesired gasses, and then sealed and placed in a HIP chamber. Then the HIP process is started, in which the particulate material is heated to a temperature ranging between 950 and 1200° C., and a high pressure of, for example 700-1200 bar is applied by argon gas. At these conditions the starting powder becomes plastic and is unified to a coherent dense material substantially without melting. Then the valve disc is removed, and if desired it can then be exposed to solution annealing, for example for 1 hour at a temperature of 1150° C. followed by quenching either in a salt bath to an intermediate temperature (typically 535° C.) followed by air cooling to room temperature, or by quenching in gases to room temperature.

Figure 5:
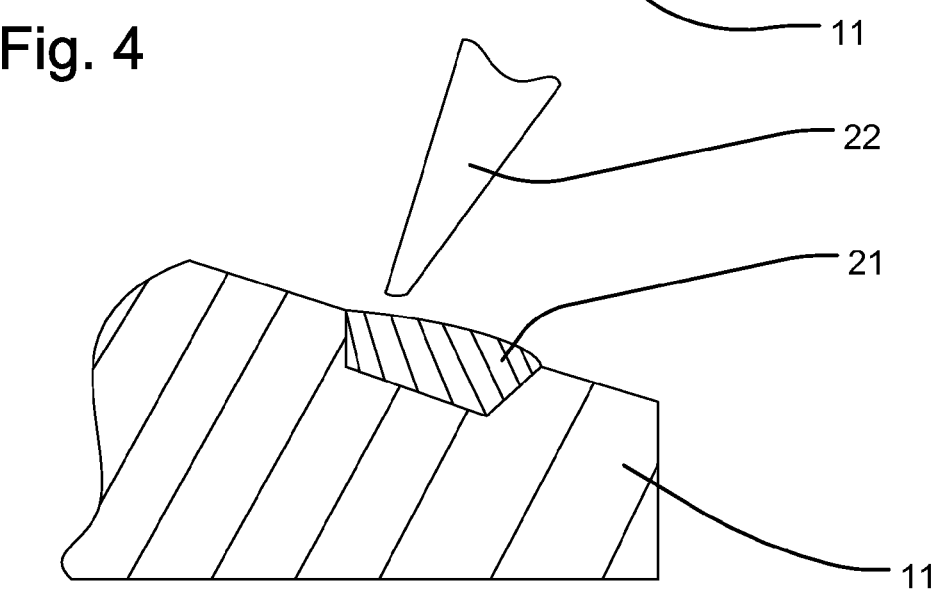

In the next step the seat material is cold deformed. This can be done in traditional manner by forging, or hammering, however for large valves rolling is preferred. FIG. 5 illustrates the outer end area of a rolling tool 22 being moved towards the outer surface of the seat material. The rolling tool is only in contact with a small area on the outer surface, compared with the complete area of the annular valve seat, and the forces required to perform the cold deformation are thus considerably smaller than the forces required for forging. On the other hand rolling is more time consuming than forging. The degree of cold deformation for the particular valve can vary, such as in the range from 4 to 60%. FIG. 6 illustrates the valve disc after the cold deformation.

The valve seat material can also be provided by forging on powder placed in the recess 20, like the forging described in WO2011/050815, to which reference is made.

The valve disc may then be subjected to heat treatment causing hardening by precipitation of γ" ($Ni_3Nb$) particles in body-centered-tetragonal configuration, followed by the valve disc being machined into the desired dimensions and the desired rounded outer edge at its largest diameter. It is also possible to perform the machining first, followed by the heat treatment causing hardening by precipitation of γ" ($Ni_3Nb$) particles in body-centered-tetragonal configuration.

Examples are now given of different alloys.

Example 1

Test specimens were made of 7 alloys according to the present invention and 9 alloys for comparison purposes. The main alloying elements Cr, Nb, Ta, Ti and Ni were determined by EDX, Energy-dispersive X-ray spectroscopy, using normalized measurements. The measured and normalized values for alloying elements are set out in the following Table 1 where the alloys numbered 9, 11, 12, 13, 14, 21 and 22 are in accordance with the present invention. Each test specimen was laser welded onto a steel substrate, and the test specimens were solution heat treated at 1100° C. for 1 hour followed by quenching. Then one set of the test specimens was heat treated at 700° C. and another set of the same test specimens was heat treated at 800° C., and the hardness of the individual test specimen was measured by HV10 after 0 hours, 1 hour, 3 hours, 9 hours and 81 hours. Alloy No. 9 showed a very slow increase in hardness, with only an increase of about 70 HV10 after 9 hours at 700° C., but after 81 hours the increase was about 230 HV10. The alloy thus exhibits the desired slow precipitation, but is for practical use too slow. The alloys Nos. 6-7, and 15-20 all showed a quick increase in hardness within the first hour, and the precipitation hardening mechanism is thus not to a sufficient extent of the desired γ" type but is predominantly of γ' or other types (traditional types). Alloy No. 10 only achieved a hardness of about 310 HV10 after 81 hours, and is thus not able to deliver the desired mechanical strength in the valve seat material.

TABLE 1

| Alloy No. | Cr | Nb | Ta | Ti | Balance | Result |
|---|---|---|---|---|---|---|
| 6 | 41 | 7.2 | 2.1 | 2.9 | Ni | 1 h, 700: HV10 > 400 |
| 7 | 42 | 6.5 | 2.0 | 1.9 | Ni | 1 h, 700: HV10 > 400 |
| 9 | 41 | 2.6 | 0.6 | 0.8 | Ni | Very slow increase |
| 10 | 41 | 2.1 | 0.6 | 0.4 | Ni | Insufficient increase |
| 11 | 41 | 2.3 | 3.5 | 0.6 | Ni | Slow increase |
| 12 | 41 | 2.3 | 3.2 | 0.5 | Ni | Slow increase |
| 13 | 41 | 2.3 | 0.7 | 1.9 | Ni | Slow increase |
| 14 | 42 | 2.0 | 0.8 | 1.6 | Ni | Slow increase |
| 15 | 41 | 2.2 | 3.6 | 2.1 | Ni | 1 h, 700: HV10 > 400 |
| 16 | 42 | 2.2 | 2.2 | 1.8 | Ni | 1 h, 700: HV10 > 400 |
| 17 | 42 | 4.9 | 0.8 | 1.8 | Ni | 1 h, 700: HV10 > 400 |
| 18 | 42 | 4.2 | 0.8 | 1.8 | Ni | 1 h, 700: HV10 > 400 |
| 19 | 42 | 5.1 | 2.8 | 0.5 | Ni | 1 h, 700: HV10 > 400 |
| 20 | 42 | 4.8 | 3.0 | 0.4 | Ni | 1 h, 700: HV10 > 400 |
| 21 | 42 | 4.7 | 0.9 | 0.6 | Ni | Slow increase |
| 22 | 41 | 5.1 | 0.5 | 0.6 | Ni | Slow increase |

Example 2

Test specimens similar to the test speciments according to the present invention in Example 1 were analysed by EDX, Energy-dispersive X-ray spectroscopy, without normalization. For each allying component the detected signals were compared to signals from a standardised probe of the component in order to determine the actual content of the component in the test specimen. The measured values are set out in the following Table 2. The treatment of the test specimens is described in Example 1. Alloy No. 9-1 showed a very slow increase in hardness. Alloys Nos. 13-1 and 14-1 have hardness increase during the first three hours at 700° C. but then flatten out at a level of about 360 HV10. Alloys Nos. 11-1, 12-1, 21-1 and 22-1 show gradual hardness increase over many hours at 700° C. up to levels of about 450 HV10. The measurements showed a too high content of Fe in Alloy 14-1 which is believed to be caused by undesired blending in of Fe from the steel substrate during the welding process.

TABLE 2

| Alloy No. | Cr | Nb | Ta | Ti | Fe | Balance | Result |
|---|---|---|---|---|---|---|---|
| 9-1 | 36.5 | 2.1 | 0.4 | 0.8 | 0.1 | Ni | Very slow increase |
| 11-1 | 38.4 | 2.1 | 1.8 | 0.6 | 0.1 | Ni | Slow increase |
| 12-1 | 38.6 | 1.8 | 2.8 | 0.5 | 0.4 | Ni | Slow increase |
| 13-1 | 39.0 | 1.8 | 0.4 | 1.7 | 0.1 | Ni | Slow increase |
| 14-1 | 38.7 | 1.6 | 0.4 | 1.6 | 1.1 | Ni | Slow increase |
| 21-1 | 38.9 | 3.5 | 0.6 | 0.5 | 0.3 | Ni | Slow increase |
| 22-1 | 37.4 | 3.0 | 0.6 | 0.4 | 0.2 | Ni | Slow increase |

Example 3

Five test specimens were made, having the composition stated in Table 3. The alloys were atomised to powders as described in the above, and rods with the dimensions outer diameter 20 mm times length 400 mm were produced by the HIP method as described in the above in steel 316 capsules. Disc-shaped specimens of the dimensions 20 mm in diameter and 10 mm in thickness were cut from the rods and solution heat treated for 1 hour in air at 1100° C., followed by water quenching. As the specimens were made of powder unified by the HIP method there was very little or no blending in of undesired contents of Fe. The alloying components were analysed by OES, Optic Emission Spectroscopy, which is more accurate than the EDX measuring method.

TABLE 3

|  | Cr | Nb | Ti | Al | B | Co | Cu |
|---|---|---|---|---|---|---|---|
| Ni40Cr5Nb | 39.3 | 5.0 | 0.5 | <0.02 | <0.005 | <0.005 | 0.01 |
| Ni35Cr4Nb | 34.4 | 3.8 | 0.5 | <0.02 | <0.005 | <0.005 | 0.06 |
| Ni45Cr4Nb | 44.8 | 4.1 | 0.5 | 0.01 | <0.005 | <0.005 | 0.01 |
| Ni45Cr6Nb | 44.5 | 6.0 | 0.5 | 0.02 | <0.005 | <0.005 | <0.005 |
| Ni35Cr6Nb | 35.2 | 6.0 | 0.5 | 0.01 | <0.005 | 0.007 | 0.06 |

|  | Fe | Mn | Mo | P | Si | Zr | C |
|---|---|---|---|---|---|---|---|
| Ni40Cr5Nb | 0.03 | <0.005 | <0.005 | <0.005 | 0.05 | <0.005 | 0.014 |
| Ni35Cr4Nb | 0.03 | <0.005 | <0.005 | <0.005 | 0.03 | <0.005 | 0.011 |
| Ni45Cr4Nb | 0.03 | <0.005 | <0.005 | <0.005 | 0.05 | <0.005 | 0.013 |
| Ni45Cr6Nb | 0.04 | <0.005 | <0.005 | <0.005 | 0.04 | <0.005 | 0.013 |
| Ni35Cr6Nb | 0.01 | <0.005 | <0.01 | 0.01 | 0.04 | <0.005 | 0.005 |

|  | S | O | N | Ni |
|---|---|---|---|---|
| Ni40Cr5Nb | 0.001 | 0.032 | 0.001 | Balance |
| Ni35Cr4Nb | 0.001 | 0.027 | 0.002 | Balance |
| Ni45Cr4Nb | 0.001 | 0.032 | 0.001 | Balance |

TABLE 3-continued

| | | | | |
|---|---|---|---|---|
| Ni45Cr6Nb | 0.001 | 0.025 | 0.001 | Balance |
| Ni35Cr6Nb | 0.001 | 0.019 | 0.001 | Balance |

Aging was performed in air at 700° C. for up to 9 h followed by water quenching. Hardness was measured with HV10 on samples prepared by wet grinding with grit 220 and 800 SiC paper. Tensile testing was performed on all alloys in the fully aged (9 h) state, and on Ni35Cr4Nb, Ni35Cr6Nb and Ni40Cr5Nb in the solution treated state. The microstructure was investigated with backscatter SEM and quantification of the area content of α-Cr was performed using ImagePro Plus on a total surface area of 0.083 mm² for each sample.

The results from hardness measurements are shown in FIG. 7 where the solution treated state is shown as 0 h. All alloys exhibited an increase of about 100 HV10 after 1 h. Hereafter, Ni45Cr6Nb showed the lowest rate of hardening; even a tendency for overaging was observed after aging for 3 h. The hardness of the remaining 4 alloys continued to increase up to 9 h.

The yield strength (YS) and ultimate tensile strength (UTS) of the alloys are collected in below Table 4. The data shows that aging more than doubles the yield strength and enhances the tensile strength, while the elongation is reduced appreciably. The elongation (El) in aged condition was high at a level of 19% for Ni35Cr4Nb.

TABLE 4

| | Solution treated | | | Aged | | |
|---|---|---|---|---|---|---|
| Alloy | YS (MPa) | UTS (MPa) | El (%) | YS (MPa) | UTS (MPa) | El (%) |
| Ni35Cr4Nb | 436 | 840 | 52.5 | 913 | 1175 | 19.1 |
| Ni35Cr6Nb | 443 | 874 | 49 | 1210 | 1382 | 6.1 |
| Ni40Cr5Nb | 646 | 1059 | 24.2 | 1305 | 1444 | 3.2 |
| Ni45Cr4Nb | — | — | — | 1274 | 1416 | 4.6 |
| Ni45Cr6Nb | — | — | — | 1425 | 1502 | 1.3 |

For both Ni35Cr alloys, only limited development of α-Cr along grain boundaries takes place. For the alloys with more than 4 wt % Nb, aging causes the appearance of a fine α-γ lamellar structure growing from the Cr regions. In the case of Ni35Cr6Nb, the lamellae grow from the grain boundaries. For alloys containing more than 35 wt % Cr grain boundaries are not visible on 10 μm backscatter electron micrographs. Nevertheless the bimodal size distribution of α-Cr regions suggests that the larger particles developed at grain boundaries, while the smaller particles developed in the grain interiors. There is an initial increase in the content of α-Cr after aging for 1 h. After this initial increase, a slight increase of the α-Cr fraction is observed for all samples.

It is desirable for the seat material that the ductility is very high prior to the cold deformation in step c). Based on the above Examples 1, 2 and 3 it is suggested that the alloy for the seat material could preferably have a composition comprising from 39 to 41% Cr, from 3.2 to 3.8% Nb, from 0.4 to 0.6% Ti, at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% 0, at the most 0.05% N, and a balance of Ni.

Example 4

A specimen of the alloy having the composition just stated was manufactured in the same manner as the specimens of Example 2. Disc-shaped specimens of the dimensions 20 mm in diameter and 10 mm in thickness were cut from the rods produced by HIP, and the specimens were solution heat treated for 1 hour in air at 1100° C., followed by water quenching. A precipitation heat treatment (aging) was performed in air at 700° C. for up to 9 h followed by water quenching. The hardness HV10 was measured, and mechanical strength tests were performed (tensile strength tests). The resulting yield strength (YS) was in average measured at 563 MPa in HIP'ed condition, the resulting yield strength (YS) was in average measured at 533 MPa in solution heat treated condition, and the resulting yield strength (YS) was in average measured at 990 MPa after precipitation hardening. The ultimate tensile strength (UTS) was in average measured at 972 MPa in HIP'ed condition, the ultimate tensile strength (UTS) was in average measured at 939 MPa in solution heat teated condition, and the ultimate tensile strength (UTS) was in average measured at 1227 MPa after precipitation hardening. The elongation was in average measured at 39.3% in HIP'ed condition, the elongation was in average measured at 40.4% in solution heat teated condition, and the elongation was in average measured at 20.5% after precipitation hardening. The alloy is thus highly suitable for cold deformation and the use as valve seat material.

The mechanical tests of yield strength, ultimate tensile strength and elongation are measured by mechanical testing according to the industrial standards, and as described in the textbook "The Structure and Properties of Materials", Volume III, Mechanical behaviour, John Wiley & Sons.

The invention claimed is:

1. An exhaust valve spindle for an exhaust valve in an internal combustion engine, which exhaust valve spindle has a shaft and a valve disc at a lower end of the shaft, which valve disc at its upper surface has a seat area, wherein the valve disc is of stainless steel and the seat area is of a nickel-based alloy comprising, stated in percent-by-weight and apart from common impurities and inevitable residual amounts of deoxidizing components, at least from 34.0 to 44.0% Cr, an aggregate amount of Nb and Ta in the range from at least 3.2 to 6.1%, from 0.3 to 2.0% Ti, at the most 0.05% Al, at the most 0.04% B, at the most 0.8% Fe, at the most 0.04% C, at the most 0.4% Si, and a balance of Ni, where the amount of Ti+Nb +0.5×Ta is in the range from 3.4 to 6.6%, and where the amount of Nb+0.5×Ta is less than 3.0% if the amount of Ti is larger than 1.5%.

2. An exhaust valve spindle as claimed in claim 1, wherein the aggregate amount of Nb, Ta and Ti in the alloy of the seat material is in the range from 4.1 to 6.6%.

3. An exhaust valve spindle as claimed in claim 1, wherein the alloy of the seat material comprises at least from 39 to 41% Cr, from 3.2 to 3.8% Nb, from 0.3 to 0.7% Ti, at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% 0, at the most 0.05% N, and a balance of Ni.

4. An exhaust valve spindle as claimed in claim 1, wherein the alloy of the seat material comprises at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% 0, at the most 0.05% N, and a balance of Ni.

5. An exhaust valve spindle for an exhaust valve in an internal combustion engine, which exhaust valve spindle has a shaft and a valve disc at a lower end of the shaft, which valve disc at its upper surface has a seat area, wherein the valve disc is of a base material and the seat area is of a seat material different from the base material, which seat material is of a nickel-based alloy comprising, stated in percent-by-weight and apart from common impurities and inevitable residual amounts of deoxidizing components, at least from 34.0 to 44.0% Cr, an aggregate amount of Nb and Ta in the range from at least 2.8 to 6.1%, from 0.3 to 2.0% Ti, at the most 0.2% Al, at the most 0.04% B, at the most 0.8% Fe, at the most 0.04% C, at the most 0.4% Si, and a balance of Ni, where the amount of Ti+Nb+0.5×Ta is in the range from 3.4 to 6.6%, and where the amount of Nb+0.5×Ta is less than 3.0% if the amount of Ti is larger than 1.5%.

6. An exhaust valve spindle as claimed in claim 5, wherein the aggregate amount of Nb and Ta in the alloy of the seat material is in the range from 3.2 to 6.1%.

7. An exhaust valve spindle as claimed in claim 5, wherein the aggregate amount of Nb, Ta and Ti in the alloy of the seat material is in the range from 4.1 to 6.6%.

8. An exhaust valve spindle as claimed in claim 5, wherein the alloy of the seat material comprises at least from 39 to 41% Cr, from 3.2 to 3.8% Nb, from 0.3 to 0.7% Ti, at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% 0, at the most 0.05% N, and a balance of Ni.

9. An exhaust valve spindle as claimed in claim 5, wherein the alloy of the seat material comprises at the most 0.05% Al.

10. An exhaust valve spindle as claimed in claim 5, wherein the alloy of the seat material comprises at the most 0.02% Al, at the most 0.005% B, at the most 0.5% Co, at the most 0.2% Cu, at the most 0.5% Fe, at the most 0.5% Mn, at the most 0.5% Mo, at the most 0.01% P, at the most 0.02 Zr, at the most 0.02% C, at the most 0.2% Si, at the most 0.02% 0, at the most 0.05% N, and a balance of Ni.

11. An exhaust valve spindle as claimed in claim 5, wherein the base material of the valve disc is of a stainless steel.

12. An exhaust valve spindle as claimed in claim 5, wherein the seat material in aged condition has the following main mechanical properties: at least a yield strength of 980 MPa, at least an ultimate tensile strength of 1200 MPa, and at least an elongation of 19%.

13. An exhaust valve spindle as claimed in claim 5, wherein the exhaust valve is a valve in a uniflow scavenging two-stroke internal combustion engine of the crosshead type.

14. A method of manufacturing an exhaust valve spindle for an exhaust valve in an internal combustion engine, which exhaust valve spindle has a shaft and a valve disc at the lower end of the shaft, which valve disc has an upper surface and at the upper surface has a seat area, comprising the steps of
 a) providing the valve disc of a base material, which valve disc is shaped with an annular recess in its upper surface, which recess extends a distance down below the upper surface of the valve disc,
 b) providing in the recess a valve seat material of a nickel-based alloy as claimed in claim 5,
 c) performing cold deformation in the seat material,
 d) subjecting the valve disc to a heat treatment causing hardening by precipitation of $\gamma''$ ($Ni_3Nb$) particles in body-centered-tetragonal configuration.

15. A method as claimed in claim 14, wherein step b) relating to the valve seat material involves a powder metallurgical process.

16. A method as claimed in claim 14, wherein step b) relating to the valve seat material involves a HIP process (Hot Isostatic Pressuring).

17. A method as claimed in claim 14, wherein step b) relating to the valve seat material involves a laser welding process.

18. A method as claimed in claim 14, wherein an intermediate step of a solution heat treatment is performed in between the steps b) and c).

19. A method as claimed in claim 14, wherein the heat treatment of step d) has a duration of at the most 9 hours.

20. A method as claimed in claim 14, wherein in step c) the seat material is cold deformed by rolling the outside surface of the seat material.

* * * * *